United States Patent [19]

Dinn

[11] 3,758,720

[45] Sept. 11, 1973

[54] CIRCUIT FOR INCREMENTALLY PHASING DIGITAL SIGNALS

[75] Inventor: Neil Francis Dinn, Tewksbury, Mass.

[73] Assignee: Bell Telephone Laboratories, Incorporated, Murray Hill, N.J.

[22] Filed: Dec. 27, 1971

[21] Appl. No.: 211,880

[52] U.S. Cl. ........... 178/67, 178/69.5 DC, 307/262, 307/269, 325/58, 328/155, 340/170

[51] Int. Cl. ........................... H04l 27/24, H04l 7/02

[58] Field of Search ......... 178/67, 69.5 R, 69.5 DC; 307/232, 262, 269; 324/83 R, 83 A, 83 FE, 86; 325/58, 346, 421; 328/72, 155; 340/170, 345

[56] References Cited

UNITED STATES PATENTS 3,647,965 3/1972 Butler ...................... 178/69.5 DC X 3,509,471 4/1970 Puente ............................ 307/269 X

*Primary Examiner*—Malcolm A. Morrison
*Assistant Examiner*—R. Stephen Dildine, Jr.
*Attorney*—W. R. Keefauver et al.

[57] ABSTRACT

A phasing circuit for a digital system requiring the relative phasing of two synchronous, periodic digital signals wherein the repetition rate of a generated synchronous reference signal is increased to enable the output and complementary output of this generator, and the phasing networks, to be repeatedly "recycled." The output of the phasing circuit is subsequently divided down in frequency to provide the properly phased periodic digital signal at the desired lower repetition rate. Since the phasing networks are thus "recycled," appreciable savings are obtained over the prior art structures which required individual networks for each incremental step of the desired phasing accuracy.

9 Claims, 4 Drawing Figures

Patented Sept. 11, 1973 3,758,720

3 Sheets-Sheet 1

| X | Y | Z | SELECT |
|---|---|---|---|
| 0 | 0 | 0 | C |
| 0 | 1 | 0 | C |
| 1 | 0 | 0 | C |
| 1 | 1 | 0 | C |
| 0 | 0 | 1 | $\overline{C}$ |
| 0 | 1 | 1 | $\overline{C}$ |
| 1 | 0 | 1 | $\overline{C}$ |
| 1 | 1 | 1 | $\overline{C}$ |

CIRCUIT FOR INCREMENTALLY PHASING DIGITAL SIGNALS

BACKGROUND OF THE INVENTION

This invention relates to digital systems and, more particularly, to phasing incrementally a periodic digital signal in a digital system.

As the efficiency with which digital information may be transmitted increases, the need to properly phase the periodic digital signal, which determines the sampling time at the receiver, relative to the timing signal derived from the transmitted timing frequency reference becomes more critical. Each quantum increase in stringency of requirements entails an increasingly higher cost in design complexity and amount of circuitry required. The bulk of this cost is directly related to the length of the period over which the periodic digital signal phase must be adjustable.

The relatively high cost and complexity of such equipment will be readily seen by referring to the incremental phasing circuit of the prior art shown in FIG. 1. The prior art phasing circuit of FIG. 1 is incremental in nature, in keeping with the digital framework, and has the capacity of having its output signal phase changed one increment at a time. For purposes of illustration, the prior art phasing circuitry of FIG. 1 assumes that the desired phasing accuracy is one-twenty-fourth of the period of the signal to be phased and hence this is the size of the incremental adjustment. This phasing accuracy implies that a minimum of 24 possible phases must be provided by the circuitry of FIG. 1 which, as discussed hereinafter therefore implies that 23 delay elements and gates must be employed along with a 24 state reversible counter and compatible gating network. The need for, and complexity of, this relatively large amount of circuitry results in a relatively very expensive circuit with reliability problems proportional to the complexity. The complexity also introduces serious design problems to large scale integration of such circuitry and, for the amount of circuitry required for higher degrees of phasing accuracy, the design problems are sufficient to prohibit such integration.

It is, accordingly, an object of this invention to provide a relatively simple phasing circuit for digital systems and thereby appreciably reduce the cost and complexity of such circuits while increasing their reliability.

It is another object of this invention to provide an incrementally adjustable phasing circuit for digital systems that is readily adaptable to large scale integration techniques.

SUMMARY OF THE INVENTION

The incremental phasing circuit of the present invention is connected to an input circuit which demodulates the transmitted signal, compares it to a known reference, and stores the difference or error signal. This input circuit has a first output indicative of the relative phase of the transmitted timing signal and a second output at the transmitted reference or pilot frequency. A phase locked oscillator, which comprises a first comparator, voltage controlled oscillator, and frequency divider network connected in an automatic phase control loop, is connected to the second output of the input circuit to receive the reference signal. The voltage controlled oscillator has both an output and a complementary output, the frequency of the outputs being greater than the frequency of the received reference signal.

The first output of the input circuit is fed to a reversible counter whose count is either advanced or delayed in accordance with the relative phase of the received timing signal. A first gating network is connected to the outputs of the reversible counter to provide output logic levels indicative of the relative phase of the transmitted timing signals. An output gating network has its inputs connected to the outputs of the first gating network and to delay networks which are connected to the outputs of yet another or third gating network, the latter gating network being connected both to the reversible counter and the output and complementary output of the phase locked oscillator. The gating network connected to the phase locked oscillator applies either the output or the complementary output of the phase locked oscillator to the delay networks and the output gating network under the control of the reversible counter. The output pulse train transmitted from the incremental phasing circuit is thus the result of a pulse train from the phase locked oscillator, which may or may not be delayed as discussed hereinafter, that passes through an individual gate in the output gating network that has been enabled by a particular output of the first gating network, the output of the first gating network being indicative of the relative phase of the received timing signal. A properly phased output pulse train which may be used to sample the received signal and regenerate the transmitted digital signal is thereby provided.

Use of the output and complementary outputs of the phase locked oscillator, which are at a higher frequency than the received reference frequency, enables the delay and output gating networks to be recycled and thereby appreciably reduces the number of circuit elements employed by the prior art. For example, if the phase locked oscillator output frequency is three times the frequency of the received reference signal and a phasing accuracy of one-twenty-fourth the period of the reference signal is desired, the total number of networks saved by the practice of the present invention is 64. If the phase locked oscillator output frequency were four times the frequency of the received reference signal and a phasing accuracy of 50 incremental steps per reference signal period were desired, a savings of 81 circuit elements results. The reduction in complexity obtained by the present invention enables a decrease in cost, an increase in reliability, and permits the use of large scale integration techniques in the fabrication of incremental phasing circuits.

BRIEF DESCRIPTION OF THE DRAWINGS

Other objects and features of the present invention will be apparent from the following detailed description and drawings, in which.

DETAILED DESCRIPTION

Figure 1:
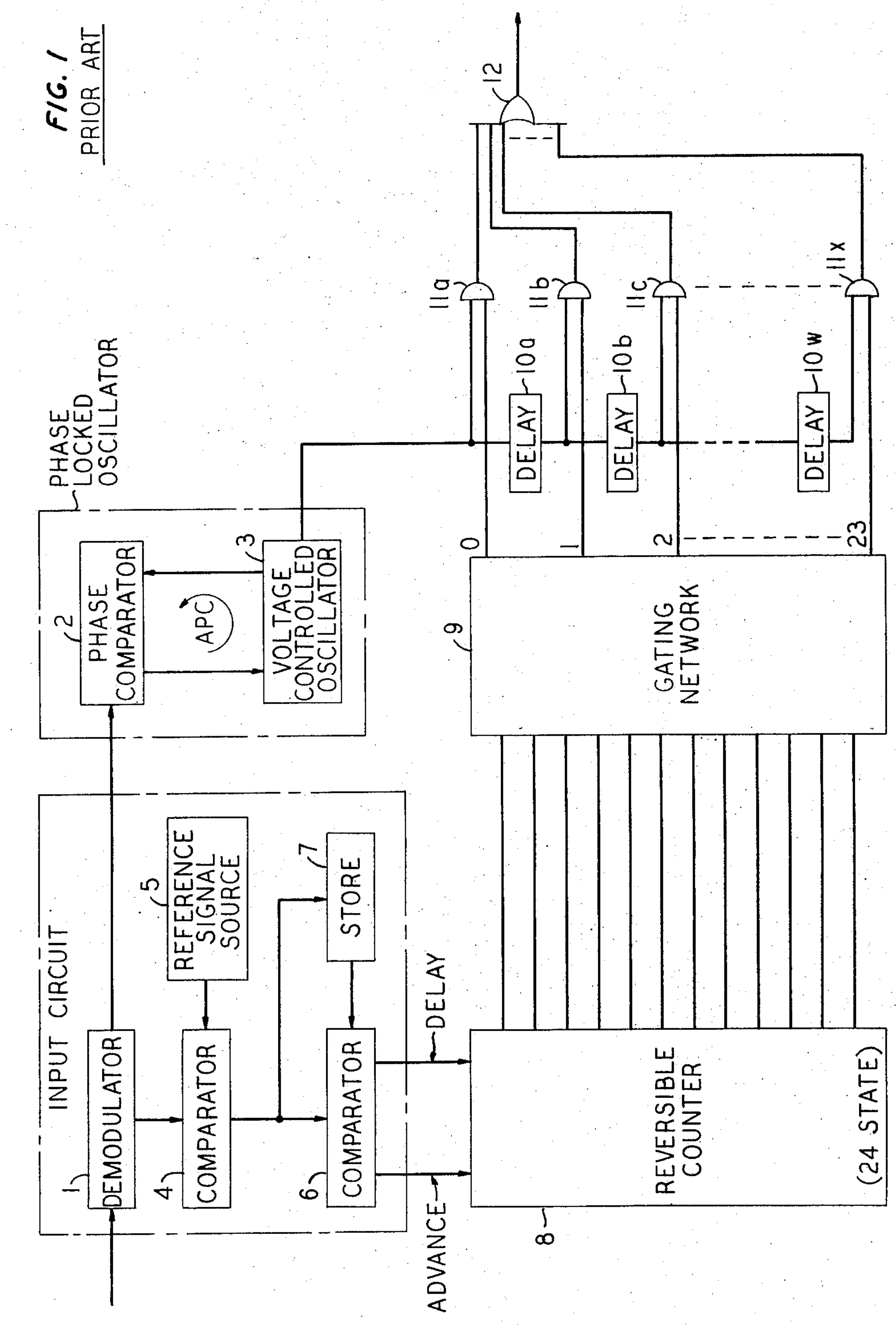
FIG. 1 PRIOR ART
FIG. 1 is a block diagram of an incremental phasing circuit employed by the prior art.
Figure 3:
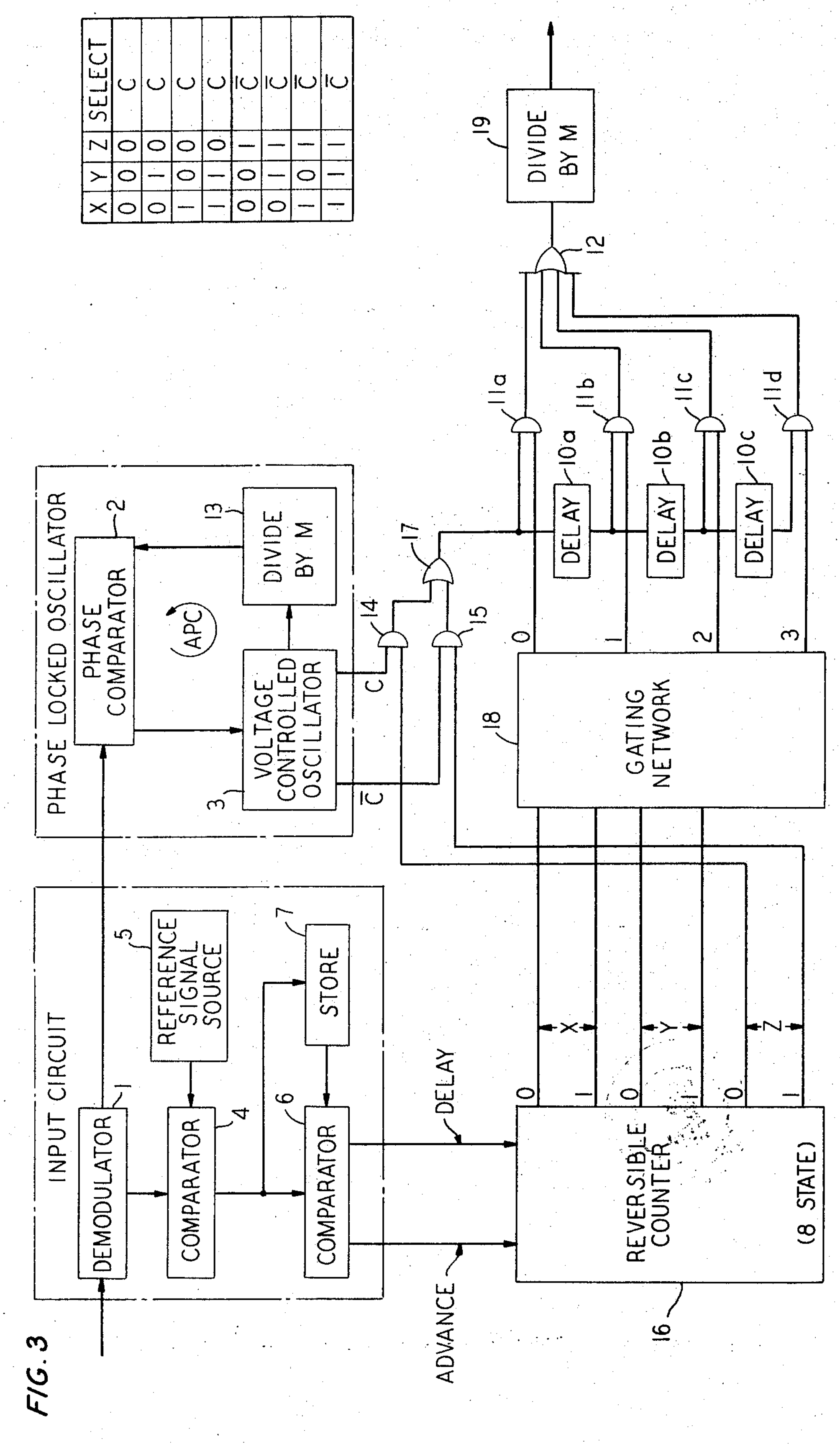
FIG. 3 is a block diagram of the incremental phasing circuit of the present invention.

Before discussing the prior art incremental phasing circuit of FIG. 1 and the incremental phasing circuit of the present invention as illustrated in FIG. 3 in detail, it is first useful to discuss the receiver circuitry which provides the inputs to both these circuits. This input circuitry could, of course, take many forms depending on the specific nature of the transmission system and the nature of the signals to be transmitted. One simple input circuit which might be employed is illustrated in both FIGS. 1 and 3. In FIG. 1, the transmitted signal input to the receiver is fed to the demodulator 1 which has two outputs; a recovered signal output and a reference or pilot signal output. The reference signal output of the demodulator 1 in FIG. 1 is fed to a phase comparator 2 which is interconnected with a voltage controlled oscillator 3 in an automatic phase control or locked loop. The phase comparator 2 and the voltage controlled oscillator 3 together form the phase locked oscillator as noted on FIG. 1.

The other output of the demodulator 1 representing the recovered signal is fed to a comparator 4 which compares a sample of the recovered signal with a reference signal sample from the reference signal source 5, which is also connected to the comparator 4. The output of the comparator 4 is an error voltage sample which is fed to the comparator 6 and a store 7, the latter of which has its output connected to the comparator 6. The comparator 6 compares the error voltage output sample from the comparator 4 with the previous error voltage sample stored in the store 7 and provides either an advance or delay signal to the reversible counter 8 based on this comparison. A new error voltage sample to the comparator smaller than the previous error voltage sample causes the timing signal information stored in the reversible counter 8 to be advanced in the same direction as the previous timing signal information whereas a new error voltage input to the comparator 6 greater than the previous error voltage causes the timing signal information stored in the reversible counter 8 to reverse in direction, i.e., to be advanced rather than delayed or vice versa. The output of the reversible counter at which a signal appears thus indicates the change in the relative phase of the recovered timing signal with respect to the relative phase of the previously received timing signal. As will be seen from the following discussion, it is then necessary to translate this change in relative timing signal phase information appearing at the reversible counter 8 to the phase of the received reference or pilot signal. This translation is accomplished by the incremental phasing circuits of FIGS. 1 and 3 which provide the properly phased output pulse train used to sample the received signal and regenerate the transmitted digital signal.

For ease of comparison and consistency, the desired phasing accuracy of one-twenty-fourth of the period of the signal to be phased, as used heretofore for illustrative purposes only, will be maintained throughout the present discussion. To obtain this phasing accuracy in the prior art circuit of FIG. 1, the reversible counter 8 would require 24 states. Similarly, the gating network 9 connected to the reversible counter 8 would also have 24 outputs. Each of the outputs of the reversible counter 8 is connected to inputs of the gating network 9.

As noted heretofore, the reference signal output from the demodulator 1 is connected to the phase comparator 2 of FIG. 1 which is, in turn, connected in an automatic phase control or locked loop with the voltage controlled oscillator 3. As symbolically represented by the dotted box around the phase comparator 2 and voltage controlled oscillator 3, these circuits provide the phase locked oscillator for the incremental phasing circuit of FIG. 1. Each of the delay networks 10 of FIG. 1 introduces an equal interval of delay and is connected in a serial string with the output of the voltage controlled oscillator 3. Thus, the first delay unit 10*a* introduces one unit of delay, the second delay unit 10*b* another unit of delay for a total of two units of delay with respect to the leading edge of the output of the phase locked oscillator, and so on, until the last network 10*w* in the series string which introduces the last unit of delay for a total of 23 delay units with respect to the leading edge of the phase locked oscillator output in accordance with the desired phasing accuracy. A 24 unit of delay, if added, would cause the leading edge of the output pulse to be in-phase with the leading edge of the next output cycle of the phase locked oscillator.

The AND gates 11 of FIG. 1 have one input connected to each of the delay networks 10, except for the AND gate 11*a* which is directly connected with the output of the voltage controlled oscillator 3 of the phase locked oscillator. The other input to each of the AND gates 11 is connected to individual outputs of the gating network 9. The outputs of the gating network 11 are connected to the inputs of the OR gate 12, the output of the OR gate being the output of the prior art incremental phasing circuit of FIG. 1. It should be noted from FIG. 1 that a phasing accuracy of 24 increments requires the use of 23 delay elements 10 and 24 AND gates 11 in addition to the use of a 24 state reversible counter 8 and compatible gating network 9.

Figure 2:
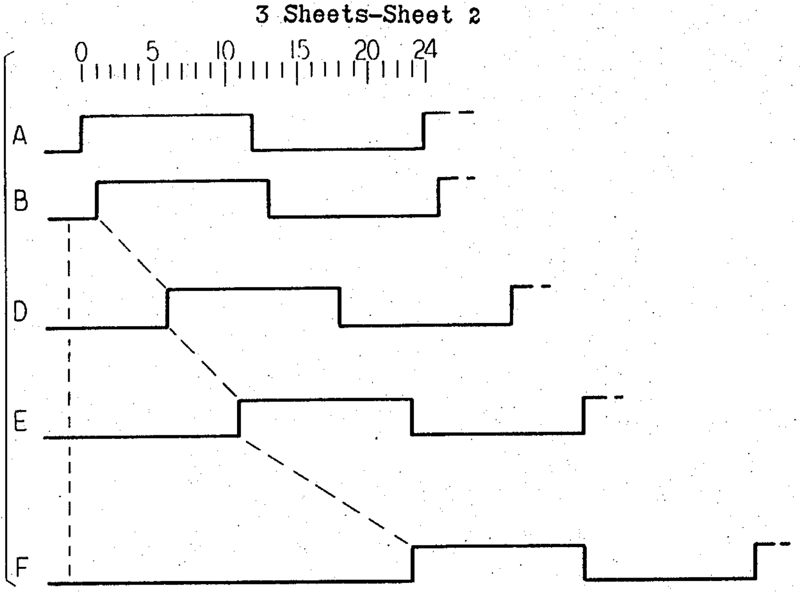
FIG. 2 illustrates various waveforms useful in discussing the FIG. 1 prior art incremental phasing circuit.

A graphical representation of some of the relative phase outputs of the incremental phasing circuit of FIG. 1 may be seen from FIG. 2 of the drawings. Waveform A of FIG. 2 serves as a reference and is the output of the voltage controlled oscillator 5 of the phase locked oscillator of FIG. 1. Waveform B shows the output of the gate 12 (i.e., the incremental phasing circuit output) for one increment of delay and corresponds to the coincidence of input pulses to the AND gate 11*b* and from delay element 10*a* a logic one level at the "1" output of the gating network 9. The coincidence of input pulses or logical ones to gate 11*b* enables only this gate with all the other gates 11 being disabled by logical zeros from the other outputs of the gating network 9. Waveform C of FIG. 2 corresponds to six units of delay, waveform D to 11 units delay, and waveform E to 23 units delay. The waveform E thus represents the output of the incremental phasing circuit of FIG. 1 which has been delayed 23/24 of a period with respect to the leading edge of reference waveform A. This output is obtained by enabling AND gate 11*x* with a logical one output at lead 23 of gating network 9, the remaining outputs of the gating network 9 being logical zeros which effectively disable each of the AND gates 11 except for the AND gate 11*x*. The output of AND gate 11*x* is fed to OR gate 12, the output of which is the output of the incremental phasing circuit of FIG. 1 as discussed heretofore.

As noted heretofore, the present invention, as illustrated in FIG. 3, provides a relatively simple incremental phasing circuit capable of producing the illustrative 24 increment phasing accuracy while at the same time reducing the cost and complexity and improving the reliability of such circuits. As also discussed heretofore, the output signals from the input circuit shown in both FIGS. 1 and 3 comprises both a reference or pilot signal output and an advance or delay signal to the reversible counter in accordance with the relative phase of the received timing signal with respect to the relative phase of the previously received timing signal. Unlike the phase locked oscillator of the prior art of FIG. 1, however, the phasing circuit of FIG. 3 includes a voltage controlled oscillator 3 and a frequency divider network 13 connected with a phase comparator 2 in an automatic phase control or locked loop. In a manner well known in the art, differences in the frequencies of the input signals to the phase comparator cause the output frequency of the voltage controlled oscillator to be varied so as to drive the frequency difference to zero. The divide by M frequency divider 13 is necessary since the output frequency of voltage controlled oscillator 3 is greater than the input reference frequency of the phase comparator 2 by a factor of M, as discussed hereinafter. As indicated on the drawing, the output of the phase locked oscillator from the voltage controlled oscillator 3 is indicated as C and its complement, which is 180 degrees out-of-phase, as C. The C output of the voltage controlled oscillator 3 is connected to one input of the AND gate 14 and the C output of voltage controlled oscillator 3 is connected to one input of AND gate 15. The other inputs of AND gates 14 and 15 are connected to the reversible counter 16. The outputs of the AND gates 14 and 15 are connected to the inputs of the OR gate 17. The output of the OR gate 17 is serially connected with the string of delay networks 10.

The outputs of the reversible counter 16 are connected to the inputs of the gating network 18. It should be noted that the reversible counter 16, which for the illustrative desired phasing accuracy may comprise three flip-flop circuits connected in a manner well known in the art, is an eight state counter in an incremental phasing circuit capable of producing any one of 24 output pulse trains with the same relative phasing as the prior art incremental phasing circuit. Similarly, the compatible gating network 18 need only comprise four AND gates interconnected in a manner well known in the art. It should be recalled at this point that the prior art phasing circuit of FIG. 1 required a 24 state counter (or five flip-flops) with a compatible gating network (24 AND gates) to provide the capability of producing any one of the same desired 24 incrementally phased output pulse sequences.

Each of the outputs of the gating network 18 is connected to an input of an individual AND gate 11. Except for the AND gate 11*a*, whose second input is connected to the output of OR gate 17, the other inputs of the remaining AND gates 11*b*, 11*c*, and 11*d* are connected to the outputs of the serial string of delay networks 10*a*, 10*b*, and 10*c*, respectively. The outputs of each of the AND gates 11 are connected to individual inputs of OR gate 12. A frequency divider 19 connects the output of OR gate 12 to the output of the phasing circuit. The pulse frequency dividers may be any of a large number of compatible dividers well known in the art. If desired, the delay networks 6 may be readily available logic gates which have propagation delays equivalent to one unit of delay, the duration of which would be determined by the desired phasing accuracy and the frequency of the transmitted signal.

The present invention is directed to an incremental phasing circuit which uses both the output and the complementary output of the phase locked oscillator, with the output frequency or rate of the phase locked oscillator being a multiple M of the reference or pilot signal rate, i.e., where $M$ = (phase locked oscillator rate/reference signal rate). In the embodiment of the present invention shown in FIG. 3 for an exemplary 24 phase output, $M$ would be equal to 3, as will be apparent from the following discussion. This novel implementation permits the cost and complexity of the phasing circuit to be reduced and the reliability increased, as noted heretofore in connection with the reversible counter, gating networks, delay networks, and AND gates.

In the illustrative example with $M$ equal to 3, the output frequency of the voltage controlled oscillator 3 appearing at the outputs C and C would thus be three times the frequency of the reference signal input to the phase comparator 2. The output frequency of the voltage controlled oscillator 3 is also fed through the frequency divider 13 to the phase comparator 2 to provide automatic phase control in the manner well known in the art. For the illustrative example where $M = 3$, the frequency divider network 13 would divide the output frequency of the voltage controlled oscillator by 3.

The operation of the reversible counter 16 in combination with the AND gates 14 and 15 and OR gate 17 will best be understood by referring to the truth table shown on FIG. 3 of the drawing. For ease of explanation, the reversible counter 16 is illustrated as having three sets of outputs, designated as X, Y, and Z, which might correspond, for example, to the outputs of three interconnected flip-flops, as noted heretofore. From the truth table shown on FIG. 3 it is readily seen that the combination of the X, Y, and Z outputs result in the eight possible states of output of the reversible counter. As can be seen from the line dividing the truth table into two sections, the four possible combinations of the X and Y outputs are cycled for the "0" Z output and then recycled for the "1" Z output. As also noted in the truth table, a "0" Z output permits the C pulses from the voltage controlled oscillator 3 to be transmitted through the AND gate 14 and the OR gate 17 to each of the delay networks 10 serially connected therewith, while a "1" Z output causes the C pulses to be transmitted through AND gate 15 and OR gate 17 to the delay networks 10. Since the desired phasing accuracy is one-twenty-fourth of the reference signal period and the reversible counter has only eight states, the reversible counter would be cycled three times to obtain the desired 24 states.

As noted heretofore, the input circuit causes the reversible counter 16 to be advanced or delayed, depending on the change in relative phase of the received timing signal. The outputs of the reversible counter 16 are, in turn, connected to a gating network 18, the outputs of which are connected to inputs of the AND gates 11. The coincidence of phase locked oscillator pulses from the OR gate 17 with a logical one level at an output of the gating network 18 at the inputs of any AND gate 11 will thus cause a delayed version of the phase locked oscillator pulses to be transmitted to the OR gate 12 and the frequency divider network 19. The frequency divider network 19 will divide the pulse repetition rate of the gate 12 output by M thereby resulting in a phasing circuit output of a sequence of pulses of the proper phase and frequency. The pulse outputs of the incremental phasing circuit of FIG. 3 will be discussed shortly in connection with FIG. 4. It should be first noted, however, that for the example of $M = 3$, the incremental phasing circuit of FIG. 3 requires only three delay networks and four AND gates to provide 24 phased output increments with these networks being "recycled" three times over a single period of the reference frequency input to the phase locked oscillator. The additional cost and complexity of the additional AND gates 14 and 15, OR gates 12 and 17, and frequency dividers 13 and 19 in the present incremental phasing circuit is more than offset by the savings in the reduced number of delay networks 10, AND gates 11, and the use of an eight state counter 16 and compatible gating network 18. The number of delay elements saved for the 24 phase increment illustration, for example, is 21, the number of AND 11 gates saved totals 19, the number of flip-flops saved in the reversible counter 16 is two, and the number of AND gates saved in the gating network 18 is 20.

Figure 4:
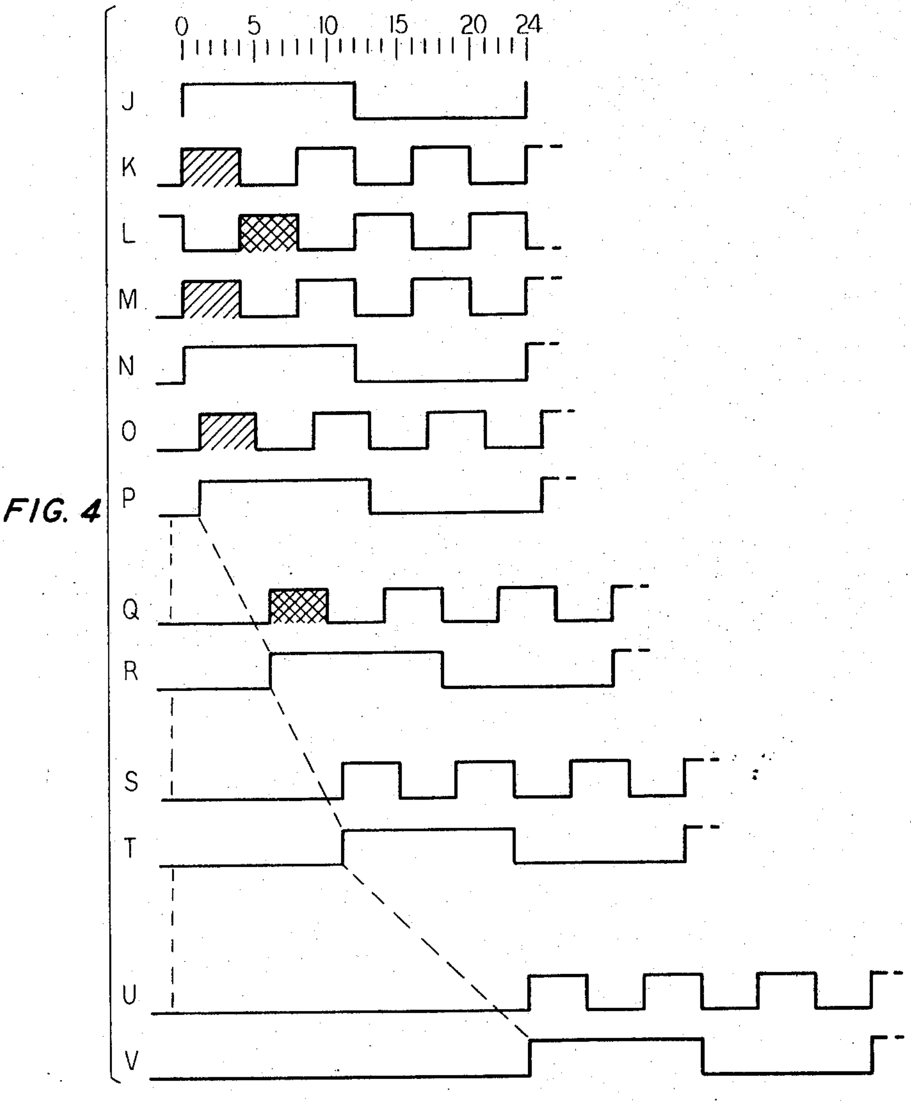
FIG. 4 illustrates waveforms useful in discussing the incremental phasing circuit of FIG. 3.

The outputs at various points in the incremental phasing circuit of FIG. 3 are graphically illustrated in FIG. 4. In FIG. 4, waveform K represents the C output of the phase locked oscillator of FIG. 3. For comparison and reference purposes, the output of the divide by M frequency divider 13 in the automatic phase control loop of the phase locked oscillator serves as the zero phase reference and is shown as waveform J in FIG. 4. Waveform M represents the output pulse train from the OR gate 12 when there is an enabling pulse from the gating network 18 at one of the inputs of the AND gate 11*a*, i.e., waveform M represents the output pulse train from the OR gate 12 when there is no delay. (For present illustrative purposes, the propagation delay through the logic elements has been assumed to be zero.) The shaded clock pulse of waveform K thus corresponds to the shaded pulse in the waveform M which has been transmitted from the C output of the voltage controlled oscillator 3 through AND gate 14, OR gate 17, AND gate 11*a*, and OR gate 12. Waveform N of FIG. 4 is the pulse train output of the frequency divide by M network 19 for the case of the no delay pulse train waveform M. A delay of one unit for the pulse train is shown by waveform O, the first pulse of which is shaded to illustrate the relationship to the phase locked oscillator pulse sequence C from the voltage controlled oscillator 3. Waveform O thus represents a delayed version of the C output pulse train which was transmitted through AND gate 14, OR gate 17, the delay network 10a, the AND gate 11b, and the OR gate 12. The output of this one unit delayed pulse train from the divide by M frequency divider network 19 is shown as waveform P.

The role played by the C phase locked oscillator complementary output pulse train will now be discussed in connection with an incremental phasing circuit output pulse train which is dealyed six units with respect to the zero phase waveform J. Waveform L of FIG. 4 represents the C or complementary pulse train output of the voltage controlled oscillator 3 of the phase locked oscillator and waveform Q represents the output pulse train from the OR gate 12 which has been delayed six units with respect to the zero phase waveform J. The initial pulses of both these pulse trains are cross-hatched in FIG. 4 to illustrate the relationship between these waveforms. Thus, for six units delay the pulse output train C, of the phase locked oscillator would be transmitted through AND gate 15, OR gate 17, through two delay networks 10*a* and 10*b* in series, the third AND gate 11c, and the OR gate 12. Waveform R corresponds to the output pulse train of the divide by M frequency divider network 19 for six units delay. (As can be seen from the waveforms of FIG. 4, the output pulse sequence from the OR gate 12 beginning in coincidence with the leading edge of the cross-hatched C pulse sequence (waveform L) represents four units of delay and would pass through AND gate 11*a*.)

In a similar fashion, waveform S illustrates the pulse train putput from the OR gate 12 with 11 units delay, with the leading pulse of the sequence corresponding to the C pulse from the phase locked oscillator which has its leading edge at the eight unit point on waveform K and is transmitted through each of delay networks 10*a*, 10*b*, and 10*c*, and AND gate 11*d*. The divide by M pulse train output of the 11 unit delay waveform S is shown as waveform T. Waveform U represents a pulse train having 23 units delay with the leading pulse of the sequence corresponding to the C pulse from the phased clock generator having its leading edge at the 20 unit point in waveform L, which is also transmitted through each of the delay networks 10*a*, 10*b*, and 10*c*, AND gate 11*d*, and OR gate 12. Waveform V is the divided pulse train output of the waveform U appearing at the output of the phasing circuit. For purposes of illustration, the output pulses preceding the start of the pulse train of interest have been omitted from waveforms Q, S, T, U, and V of FIG. 4. It should be understood, however, that these waveforms would be a continuous series of pulses whose relative phase may be advanced or delayed in accordance with the relative phase of the received timing signal.

It should be obvious that ratios of M, other than three, could be obtained in the practice of the present invention, with both this number, and the phasing accuracy of one-twenty-fourth of the period of the reference signal, being chosen for illustrative purposes only. The modifications to the number of states of the reversible counter 16, the gating network 18, the delay element 10, AND gates 11, and/or the frequency output of the voltage controlled oscillator 3 to obtain other ratios for M for various phasing accuracies is believed to be obvious in view of the foregoing discussion. Such modifications would also reduce the cost and complexity of the phasing circuit of the present invention when compared with the structures of the prior art. For example, if the number of incremental phasing circuit elements required is given as the sum of the number of delay elements, the number of gates, and the number of flip-flops required to count down from the phase locked oscillator, then for $M = 4$ and 40 incremental steps per reference signal period, the prior art method of FIG. 1 would require approximately 80 circuit elements, whereas the present invention would require approximately 17 circuit elements to obtain the same result. The present invention thus results in a savings of $80 - 17 = 63$ circuit elements. For $M = 4$ and fifty incremental steps per clock period, a savings of $100 - 19 = 81$ circuit elements is obtainable with the present invention. Similar results may be shown for various values of M and various numbers of incremental steps.

It should be additionally noted that the proposed phasing scheme is readily adaptable to timing search applications, since the timing can be incrementally advanced or delayed as far as desired without incurring a large phase perturbation or jitter after a delay or advancement of one reference period. This is because the output of the phase locked oscillator is not affected by changes in the phase of the phasing circuit output sequence. The phase locked oscillator need only provide a stable reference signal from the received reference or pilot signal. The desired phasing is then established with reference to the phase locked oscillator output by the reversible counter in accordance with the advance or delay signals from the input circuit. Since the phasing is done in this manner and not in a typical automatic phase control loop arrangement, there are no longer any large deviations in the error voltage of the voltage controlled oscillator in the loop caused by cycle-slipping, and the phase jitter is thereby appreciably reduced.

The reduction in the number of components required from the incremental phasing circuit of the prior art also makes the incremental phasing circuit of the present invention easily implemented using large scale integration techniques. In such an implementation, the propagation delay through the logic gates could be used as the basic delay elements 10.

The above-described arrangement is illustrative of the application of the principles of the invention. Other embodiments may be devised by those skilled in the art without departing from the spirit and scope thereof.

What is claimed is:

1. A circuit for incrementally phasing digital signals connected to an input circuit with a first output indicative of the relative phase of the transmitted timing signal and a second output at the transmitted reference frequency comprising a reversible counter connected to the first output of said input circuit to adjust said reversible counter in accordance with the relative phase of said transmitted timing signal, an oscillator having its input connected to receive the transmitted reference frequency at the second output of said input circuit, said oscillator having a first output and a second output, complementary to the first output, both outputs being at a frequency greater than said transmitted reference frequency, a first gating network connected to the output of said reversible counter to provide outputs indicative of the relative phase of said transmitted timing signals in accordance with the output of said reversible counter, an output gating network connected to the output of said first gating network, a delay network connected to said output gating network, the output of said output gating network being interconnected as the output of said circuit for incrementally phasing digital signals, and second gating network having its inputs connected to said reversible counter and the first output and second complementary output of said oscillator, the output of said second gating means being connected to said delay network to apply either said output or complementary output of said oscillator, as determined by said reversible counter, to said delay network and said output gating network at a frequency greater than said transmitted reference frequency.

2. A circuit for incrementally phasing digital signals in accordance with claim 1 wherein said oscillator is a phase locked oscillator which comprises a phase comparator connected to said input circuit, a voltage controlled oscillator connected to the first and second complementary outputs of said phase locked oscillator, and a frequency divider serially connected in an automatic phase control loop with said phase comparator and said voltage controlled oscillator to reduce the frequency output of said voltage controlled oscillator to the frequency of said transmitted reference signal.

3. A circuit for incrementally phasing digital signals in accordance with claim 2 wherein a second frequency divider is connected between the output of said output gating network and the output of said circuit for incrementally phasing digital signals to divide the frequency output of said output gating network by the ratio of said phase locked oscillator frequency to said transmitted reference frequency.

4. A circuit for incrementally phasing digital signals in accordance with claim 3 wherein said second gating network comprises first and second AND gates, one input of said first AND gate being connected to the first output of the voltage controlled oscillator of said phase locked oscillator while the other input is connected to said reversible counter, one input of said second AND gate being connected to the second complementary output of the voltage controlled oscillator of said phase locked oscillator while the other input is connected to said reversible counter, and means connecting the outputs of said first and second AND gates to said delay network.

5. A circuit for incrementally phasing digital signals in accordance with claim 4 wherein said delay network comprises at least an individual logic gate having a propagation delay equivalent to one unit of delay of a duration determined by the desired phasing accuracy for said circuit for incrementally phasing digital signals.

6. A circuit for incrementally phasing digital signals connected to an input circuit with a first output indicative of the relative phase of the transmitted timing signal and a second output at the transmitted reference frequency, a reversible counter connected to the first output of said input circuit to adjust said reversible counter in accordance with the relative phase of said transmitted timing signal, an oscillator having its input connected to receive the transmitted reference frequency at the second output of said input circuit, said oscillator having a first output and a second output, complementary to the first output, both outputs at a frequency which is a multiple greater than said transmitted reference frequency, a first gating network connected to the output of said reversible counter to provide logic level outputs indicative of the relative phase of said transmitted timing signals in accordance with the output of said reversible counter, a plurality of output AND gates each having first and second inputs, the outputs of said plurality of output AND gates being interconnected as the output of said circuit for incrementally phasing digital signals, a plurality of delay networks, means connecting the first input of each of said first plurality of said output AND gates with individual outputs of said first gating network, means connecting each of said plurality of delay networks in a series string with individual delay networks connected between the second inputs of each pair of said plurality of output AND gates, and first and second individual AND gates each having one input connected to said reversible counter, the other input of said first individual AND gate being connected to the first output of said oscillator while the other input of said second individual AND gate is connected to the second complementary output of said oscillator, the outputs of said first and second individual AND gates being connected with said string of said plurality of delay networks such that either said output or said complementary output of said oscillator is applied, as determined by said reversible counter, to said plurality of delay networks and the first AND gate of said plurality of AND gates at a frequency which is a multiple of said transmitted reference.

7. A circuit for incrementally phasing digital signals in accordance with claim 6 wherein said oscillator is a phase locked oscillator which comprises a phase comparator connected to said input circuit, a voltage controlled oscillator connected to the first and second complementary outputs of said phase locked oscillator, and a frequency divider serially connected in an automatic phase control loop with said phase comparator and said voltage controlled oscillator to reduce the frequency output of said voltage controlled oscillator to the frequency of said transmitted reference signal.

8. A circuit for incrementally phasing digital signals in accordance with claim 7 wherein a second frequency divider is connected between the interconnected outputs of said plurality of output AND gates and the output of said circuit for incrementally phasing digital signals to divide the frequency output of said output gating network by the ratio of said phase locked oscillator frequency to said transmitted reference frequency.

9. A circuit for incrementally phasing digital signals in accordance with claim 8 wherein each of said plurality of delay networks comprises an individual logic gate, each of said individual logic gates having substantially equal propagation delays equivalent to one unit of delay of a duration determined by the desired phasing accuracy.

* * * * *